United States Patent
Yang

(10) Patent No.: US 8,775,126 B2
(45) Date of Patent: Jul. 8, 2014

(54) MOBILE DEVICE AND METHOD FOR PERFORMING BLACK BOX FUNCTION

(75) Inventor: Suk Jae Yang, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 12/849,217

(22) Filed: Aug. 3, 2010

(65) Prior Publication Data
US 2011/0118992 A1  May 19, 2011

(30) Foreign Application Priority Data
Nov. 19, 2009 (KR) .................. 10-2009-0112003

(51) Int. Cl.
G06F 17/40 (2006.01)
(52) U.S. Cl.
USPC .................. 702/187; 702/183; 702/185
(58) Field of Classification Search
USPC ......... 702/187, 57–59, 64–65, 178, 185, 183; 361/93.1; 370/252
See application file for complete search history.

(56) References Cited

U.S. PATENT DOCUMENTS

| | | | | |
|---|---|---|---|---|
| 6,081,466 A | * | 6/2000 | McClure et al. | 365/201 |
| 6,700,766 B2 | * | 3/2004 | Sato | 361/93.1 |
| 8,006,121 B1 | * | 8/2011 | Samoilova et al. | 714/2 |
| 2009/0154039 A1 | * | 6/2009 | Tsugawa | 361/56 |
| 2009/0265318 A1 | * | 10/2009 | Vermeulen | 707/3 |

FOREIGN PATENT DOCUMENTS

JP  2007195330 A  *  8/2007

OTHER PUBLICATIONS

Machine Translation of JP 2007195330 A.*

* cited by examiner

*Primary Examiner* — Sujoy Kundu
*Assistant Examiner* — Harun Chowdhury
(74) *Attorney, Agent, or Firm* — Jefferson IP Law, LLP

(57) ABSTRACT

A mobile device and method for performing a black box function are provided. Each of a plurality of connection ports of the mobile device are electrically connected to an external entity. When a voltage exceeding a given critical value is applied through the connection port, a detection history recording unit of the mobile device not only checks detection time information, but also checks terminal ID information about the connection port. Then the detection history recording unit records the terminal ID information and the detection time information. Therefore, when any trouble or fault occurs in the mobile device, it is possible to easily find out the cause of such trouble or fault though data recorded in the detection history recording unit.

20 Claims, 3 Drawing Sheets

MOBILE DEVICE AND METHOD FOR PERFORMING BLACK BOX FUNCTION

PRIORITY

This application claims the benefit under 35 U.S.C. §119 (a) of a Korean patent application filed on Nov. 19, 2009 in the Korean Intellectual Property Office and assigned Serial No. 10-2009-0112003, the entire disclosure of which is hereby incorporated by reference.

BACKGROUND OF THE INVENTION

1. Field of the Invention

The present invention relates to a mobile device. More particularly, the present invention relates to a black box function that records details of an operation in a mobile device and is useful for determining the cause of trouble or fault in that device.

2. Description of the Related Art

Nowadays, a great variety of mobile devices are being widely used. During normal operation, the possibility exists that these mobile devices may experience any of various troubles or that a fault may occur unexpectedly due to certain causes related to hardware or software. The cause of such troubles or faults may be the occurrence of a defect or other manufacturing issue or may be related to certain use or misuse of the mobile device. For instance, some components in a mobile device may be damaged due to a physical impact or an electric shock caused by a user's misuse or carelessness. Additionally, when any improper software is downloaded or any unsuitable connector is used for download, a mobile device may operate unusually.

However, when any trouble or fault occurs in a mobile device, it is difficult to determine the cause of such trouble or fault. Specifically, it is difficult to determine whether such trouble or fault is caused by hardware or by software and whether it is due to a manufacturing process from use. Unfortunately, this may often bring about much difficulty in repairing a mobile device.

SUMMARY OF THE INVENTION

An aspect of the present invention is to address at least the above-mentioned problems and/or disadvantages and to provide at least the advantages described below. Accordingly, an aspect of the present invention is to provide a mobile device and method for performing a black box function.

In accordance with an aspect of the present invention, a mobile device is provided. The mobile device includes an external connection terminal including a plurality of connection ports for electrical connection to an external entity, a control unit for performing a particular function using the external entity when the external entity is connected, and a detection history recording unit determining and recording detection time information when a voltage exceeding a critical value is applied through at least one of the connection ports, and for recording terminal ID information about the voltage-applied connection port.

In an exemplary implementation, each of the connection ports may include a zener diode for sending the voltage to detection history recording unit if the voltage is greater than the critical value, and for sending the voltage to the control unit if the voltage is smaller than the critical value.

Additionally, in another exemplary implementation, the detection history recording unit may include an adjustable resistor for dropping the voltage when the voltage is applied through the zener diode, a detection controller for determining the detection time information and the terminal ID information when the voltage is applied through the adjustable resistor, and a history memory for storing the detection time information and the terminal ID information under the control of the detection controller.

Furthermore, in yet another exemplary implementation, when the control unit accesses a software provider or other mobile device and downloads software, the detection controller may record initial information about the software, start time information about software download, and stop time information about the software download.

In accordance with another aspect of the present invention, a method for performing a black box function in a mobile device is provided. The method includes when a voltage exceeding a critical value is applied through at least one of a plurality of connection ports, determining terminal ID information about the voltage-applied connection port and detection time information, and recording the terminal ID information and the detection time information.

In an exemplary implementation of the method, the determining of the terminal ID information and the detection time information includes adjusting the applied voltage by an adjustable resistor, and determining the terminal ID information and the detection time information when the adjusted voltage is detected.

Additionally, the method may further comprise, when software is downloaded, recording initial information about the software, start time information about software download, and stop time information about the software download.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
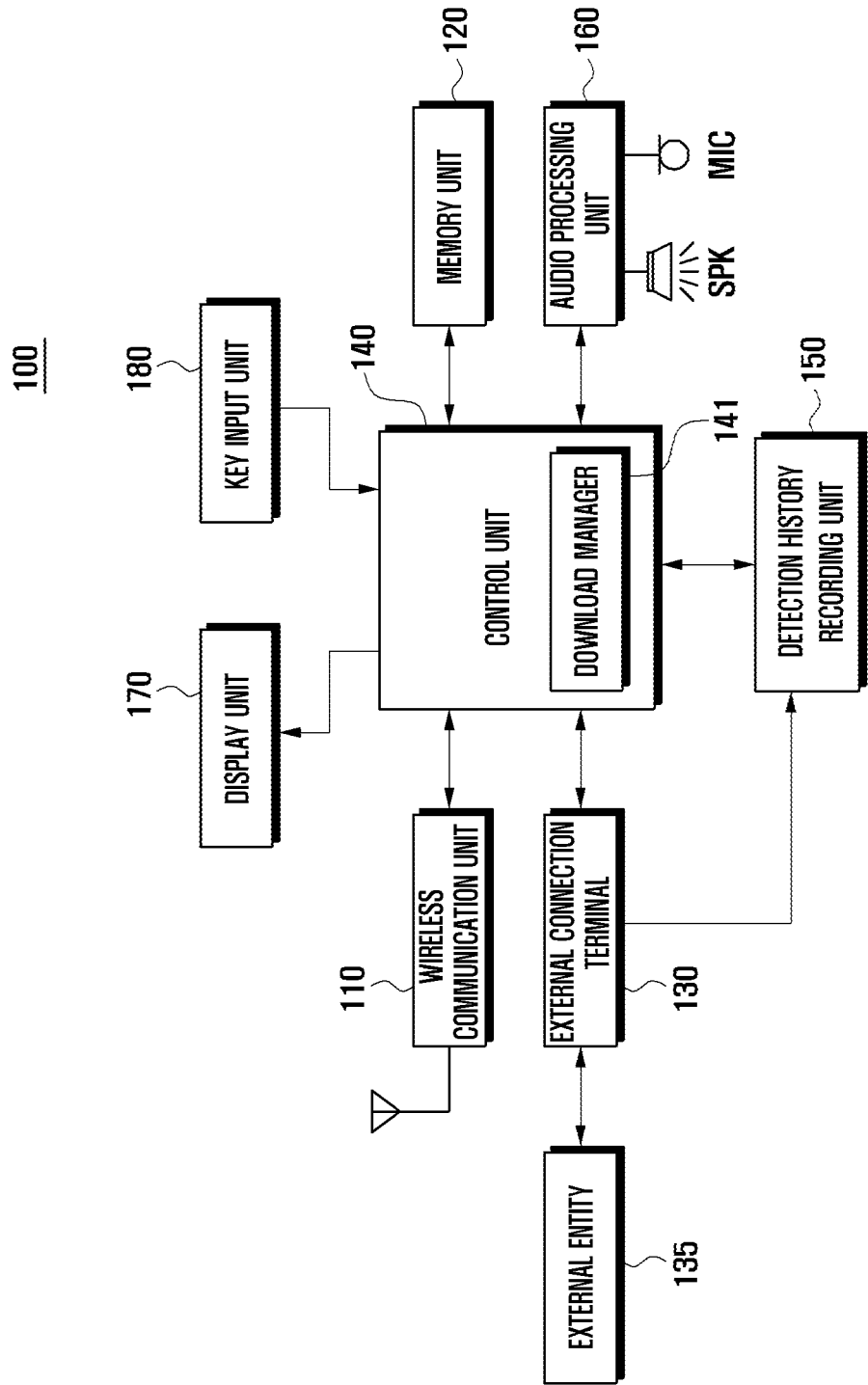
FIG. 1 is a block diagram illustrating the configuration of a mobile device according to an exemplary embodiment of the present invention.
Figure 2:
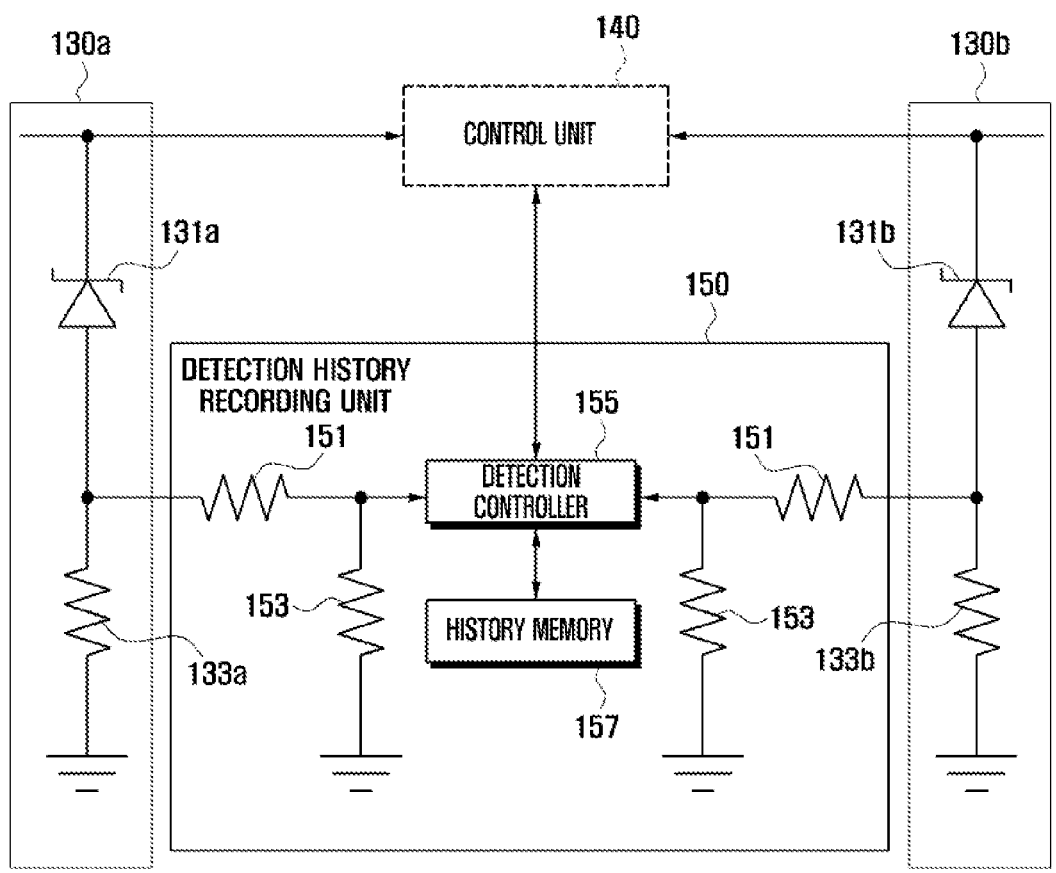
FIG. 2 illustrates an external connection terminal and a detection history recording unit according to an exemplary embodiment of the present invention.

FIG. 1 is a block diagram illustrating the configuration of a mobile device according to an exemplary embodiment of the present invention. Additionally, FIG. 2 illustrates an external connection terminal and a detection history recording unit according to an exemplary embodiment of the present invention. The following exemplary embodiment will be described on the assumption that a mobile device is a portable handset. This is, however, exemplary only and not to be considered as a limitation of the present invention.

Referring to FIG. 1, the mobile device 100 includes a wireless communication unit 110, a memory unit 120, an external connection terminal 130, a control unit 140, a detection history recording unit 150, an audio processing unit 160, a display unit 170, and a key input unit 180.

The wireless communication unit 110, also referred to as a Radio Frequency (RF) unit, performs a wireless communication function of the mobile device 100. More specifically, the wireless communication unit includes an RF transmitter which upwardly converts the frequency of signals to be transmitted and amplifies the signals, and an RF receiver which amplifies received signals with low-noise and downwardly converts the frequency of the received signals.

The memory unit 120 may consist of a program region and a data region. The program region stores a variety of programs required for controlling general operations of the mobile device 100. More particularly, the program region in this exemplary embodiment may store a specific program for performing a black box function. The data region stores data used or created while such programs are running.

The external connection terminal 130 provides a physical and electrical connection to external devices with which the mobile device 100 may interface. Namely, the external connection terminal 130 may be electrically connected to any external entity 135 and then perform a communication function. Additionally, the external connection terminal 130 is exposed to the outside in order to establish a physical connection with any external entity that includes, but not limited to, a Subscriber Identity Module (SIM) card, a charger, a Universal Serial Bus (USB), a flash memory card such as a Secure Digital (SD) memory card, a battery, an earphone, and the like.

Referring to FIG. 2, the external connection terminal 130 is composed of two or more connection ports 130a and 130b. The respective connection ports 130a and 130b may be connected to different external entities. In addition, each of the connection ports 130a and 130b has a zener diode 131a, 131b and a port resistor 133a, 133b.

The zener diode 131a, 131b changes the direction of an electric current according to a voltage applied from the outside. Namely, the zener diode 131a, 131b sends an electric current to the control unit 140 if a voltage is smaller than a critical value, but sends an electrical current to the detection history recording unit 150 if a voltage is greater than the critical value.

The port resistors 133a, 133b respectively support the flow of an electric current from the zener diodes 131a, 131b to the detection history recording unit 150. More specifically, each of the port resistors 133a, 133b is respectively coupled at one end to the zener diode 131a, 131b and coupled at the other end to ground. In addition, a branch line extended between the respective port resistors 133a, 133b and the zener diodes 131a, 131b is coupled to the detection history recording unit 150, allowing an electric current to flow from the respective zener diodes 131a, 131b to the detection history recording unit 150.

Returning to FIG. 1, the control unit 140 performs a function to control general operations of the mobile device 100. More specifically, the control unit 140 includes a data processor which not only encodes and modulates signals to be transmitted, but also demodulates and decodes received signals. The data processor may be composed of a modem and a codec. Here, a codec may have a data codec suitable for processing packet data and an audio codec suitable for processing audio signals. Additionally, the control unit 140 may access a software providing server (not shown) or any other mobile device (not shown) and for downloading software. Here, the wireless communication unit 110 is used for wireless access, and the external connection terminal 130 is used for wired access.

More particularly, the control unit 140 includes a download manager 141 that detects initial information about software and sends it to the detection history recording unit 150. Here, initial information may be version information about software, for example. Additionally, the download manager 141 notifies the start and stop of software download to the detection history recording unit 150. Here, when the download of software is completed or suspended, the download manager 141 regards each situation as the stop of the download and notifies the detection history recording unit 150.

The detection history recording unit 150 performs a black box function to record the state of the mobile device 100. More specifically, the detection history recording unit 150 senses a physical impact or an electric shock applied to the mobile device 100 from the outside and records it. Additionally, the detection history recording unit 150 senses the download of software by the control unit 140 and records it. More particularly, the detection history recording unit 150 operates in a sleep mode as well as an active mode. In case of an active mode of the mobile device 100, the detection history recording unit 150 can operate by means of electric power supplied by a normal battery (not shown). In case of a sleep mode of the mobile device 100, the detection history recording unit 150 can operate by means of electric power supplied by a backup battery (not shown).

As shown in FIG. 2, the detection history recording unit 150 includes adjustable resistors 151, box resistors 153, a detection controller 155, and a history memory 157. Here, the detection history recording unit 150 may be coupled to the connection ports 130a and 130b of the external connection terminal 130 through separate paths. Therefore, the detection history recording unit 150 may have several adjustable resistors 151 and several box resistors 153 corresponding to the respective connection ports 130a and 130b. Of course, while two connection ports are illustrated, there may also be three or more connection ports.

The adjustable resistor 151 sends an electric current to the detection controller 155 from the external connection terminal 130 by adjusting a voltage applied to the external connection terminal 130. Namely, the adjustable resistor 151 drops a voltage applied to the external connection terminal 130, depending on its given resistance. Therefore, the adjustable resistor 151 can reduce a possibility that the detection controller 155 will be damaged due to overvoltage.

The box resistor 153 supports the flow of an electric current from the adjustable resistor 151 to the detection controller 155. More specifically, each of the box resistors 153 is respectively coupled at one end to the adjustable resistor 151 and coupled at the other end to ground. In addition, a branch line extended between the box resistor 153 and the adjustable resistor 151 is coupled to the detection controller 155, allowing an electric current to flow from the adjustable resistor 151 to the detection controller 155.

The detection controller 155 controls general operations of the detection history recording unit 150. More specifically, when a voltage is applied through the adjustable resistor 151, the detection controller 155 checks terminal ID information and detection time information about the external connection terminal 130 and records them. Here, in order to distinguish the connection ports 130*a* and 130*b* in the external connection terminal 130, terminal ID information is assigned separately to each of the connection ports 130*a* and 130*b*. Namely, the detection controller 155 determines terminal ID information by finding a specific connection port 130*a* or 130*b* to which a voltage is actually applied. Also, the detection controller 155 further determines detection time information from the time when a voltage is applied. On the other hand, in a case in which the control unit 140 downloads software, the detection controller 155 checks and records software initial information, software download start time information, and software download stop time information. Namely, the detection controller 155 receives initial information about software from the control unit 140, determines start time information from the time when the software download is started, and also determines stop time information from the time when the software download is stopped.

The history memory 157 stores data created while a black box function is performed. Specifically, the history memory 157 may store the aforesaid terminal ID information and detection time information. In addition, the history memory 157 may store initial information, start time information and stop time information with regard to software.

Returning to FIG. 1, the audio processing unit 160 receives audio signals from the audio codec of the data processor and then outputs them through a speaker (SPK). Additionally, the audio processing unit 160 receives audio signals from a microphone (MIC) and sends them to the audio codec of the data processor.

The display unit 170 represents user data output from the control unit 140. The display unit 170 may be formed of a Liquid Crystal Display (LCD) or any other equivalent. In case of employing an LCD, the display unit 170 may be composed of an LCD controller, an image data memory, and an LCD panel. In some exemplary embodiments, the display unit 170 may be formed of a touch screen which acts together as an input unit.

The key input unit 180 includes a plurality of alphanumeric keys and various special function keys.

Figure 3:
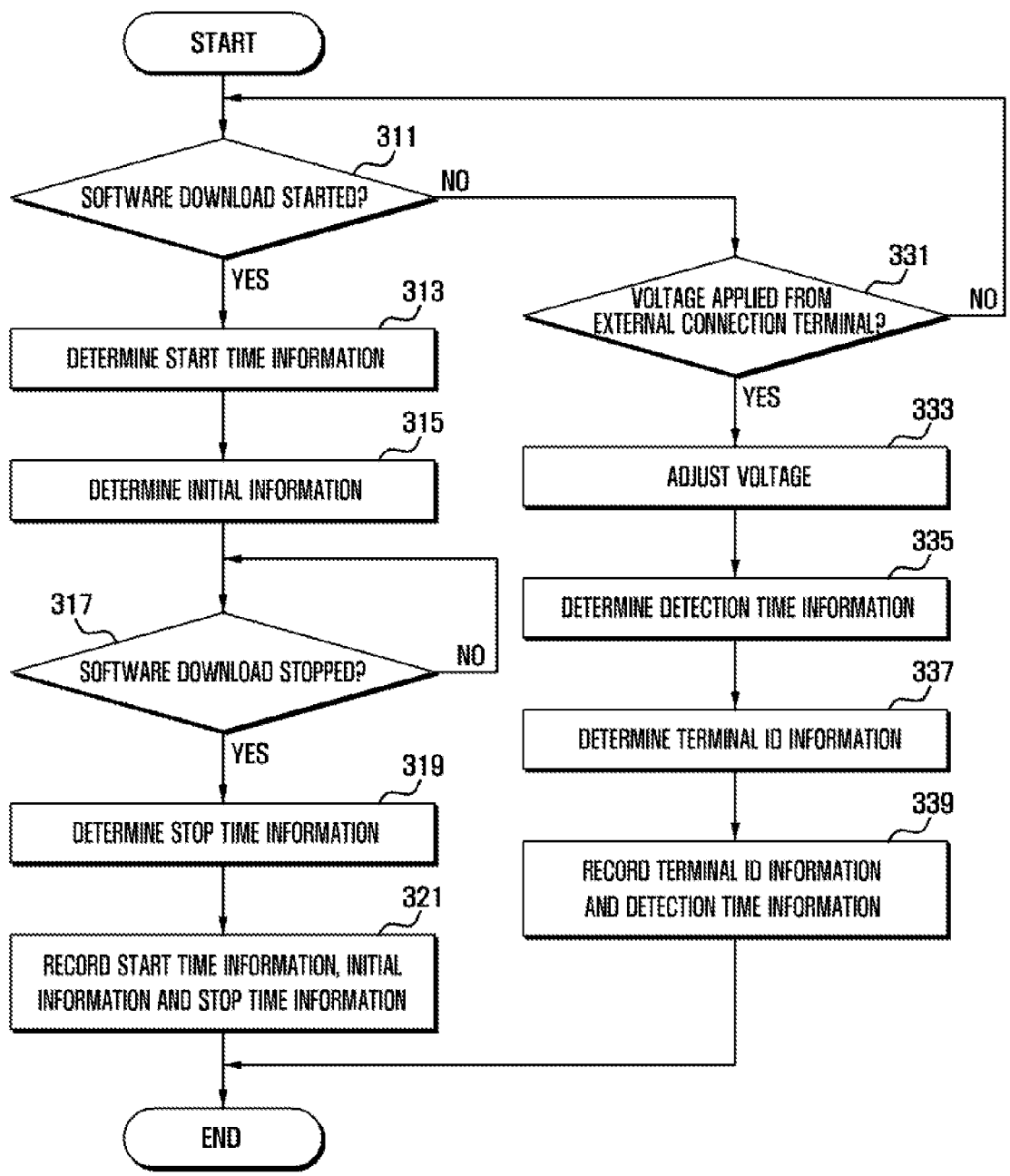
FIG. 3 is a flow diagram illustrating a method for performing a black box function in a mobile device according to an exemplary embodiment of the present invention.

FIG. 3 is a flow diagram illustrating a method for performing a black box function in a mobile device according to an exemplary embodiment of the present invention.

Referring to FIG. 3, the method for performing the black box function in the mobile device 100 may begin with the start of software download. Accordingly, the detection controller 155 determines if a software download has started in step 311.

In this step, the detection controller 155 may determine the start of software download when receiving a notification from the control unit 140. If it is determined in step 311 that the software download starts, the detection controller 155 determines start time information of software download in step 313. In this step, the detection controller 155 can determine start time information by identifying the current time when the start of software download is notified by the control unit 140. The detection controller 155 determines initial information of software in step 315. In this step, the detection controller 155 can obtain initial information of software by receiving it from the control unit 140.

In step 317, the detection controller 155 determines if the software download has stopped. If it is determined in step 317 that the software download has stopped, the detection controller 155 determines stop time information of the software download in step 319. In these steps, when the stop of software download is notified by the control unit 140, the detection controller 155 can be aware of the stop of software download and also determine stop time information by identifying the current time. In step 321, the detection controller 155 records start time information, initial information and stop time information.

If it is determined in step 311 that the software download does not start, the detection controller determines in step 331 if a voltage is applied to the external connection terminal 130. In an exemplary implementation, the determination is based on receiving voltage by the adjustable resistor 151. Namely, if a voltage exceeding a critical value is applied to a specific one of the connection ports 130*a* and 130*b*, a corresponding one of the zener diodes 131*a* and 131*b* sends an electric current to the adjustable resistor 151. In step 333, the adjustable resistor 151 sends an electric current to the detection controller 155 by adjusting a voltage. Here, the adjustable resistor 151 drops a voltage depending on its given resistance.

In step 335, the detection controller 155 determines detection time information about voltage. In this step, when a voltage is applied through the adjustable resistor 151, the detection controller 155 can determine detection time information by identifying the current time. Additionally, the detection controller 155 determines terminal ID information about the external connection terminal 130 in step 337. In this step, by finding a path of an electric current in the external connection terminal 130, the detection controller 155 can identify a specific connection port 130*a* or 130*b* through which an electric current flows, and also determine terminal ID information about that connection port 130*a* or 130*b*. The detection controller 155 records terminal ID information and detection time information in step 339.

Meanwhile, although not illustrated, the detection controller 155 may offer data stored in the history memory 157 to any external entities at their request. At this time, the detection controller 155 may offer data through a wired connection using the external connection terminal 130 or a wireless connection using the wireless communication unit 110.

As discussed above, the detection history recording unit 150 of the mobile device 100 senses and records an electric shock from the outside or software download by the control unit 140. This embodiment is, however, exemplary only and not to be considered as a limitation of the present invention. Additionally, the detection history recording unit 150 of the mobile device 100 may also sense and record a physical impact from the outside. For this, the detection history recording unit 150 may further have a motion or shock sensor (not shown) for sensing a physical impact from the outside. Namely, when such a sensor senses any physical impact, the detection controller 155 may record it.

As fully discussed hereinbefore, when any trouble or fault occurs in the mobile device 100, it is possible to easily find out the cause of such trouble or fault though data recorded in the detection history recording unit 150. Namely, by allowing the detection history recording unit 150 to sense and record a physical impact or an electric shock from the outside and a software download, it is possible to know whether such trouble or fault is caused by hardware or by software. Furthermore, by allowing the detection history recording unit 150 to record detection time information about impact or shock and also start time and stop time information about a software download, it is possible to know whether such trouble or fault occurs during a manufacturing process or during use. It is therefore possible to easily repair the mobile device 100 when an unexpected trouble or fault occurs.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device comprising:
   an external connection terminal including a plurality of connection ports for electrical connection to an external entity;
   a control unit for performing a particular function using the external entity when the external entity is connected; and
   a detection history recording unit for determining and recording detection time information and for recording terminal Identification (ID) information about a voltage-applied connection port when a voltage exceeding a critical value is applied through at least one of the connection ports,
   wherein the detection history recording unit determines whether the voltage exceeding the critical value is applied through at least one of the connection ports in response to determining that a software download has not started after receiving a notification to download.

2. The mobile device of claim 1, wherein each of the connection ports comprises a zener diode for sending the voltage to the detection history recording unit if the voltage is greater than the critical value, and for sending the voltage to the control unit if the voltage is less than the critical value.

3. The mobile device of claim 2, wherein the detection history recording unit comprises:
   an adjustable resistor for dropping the voltage when the voltage is applied through the zener diode;
   a detection controller for determining the detection time information and the terminal ID information when the voltage is applied through the adjustable resistor; and
   a history memory for storing the detection time information and the terminal ID information under the control of the detection controller.

4. The mobile device of claim 3, wherein when the control unit accesses at least one of a software provider and another mobile device and downloads the software, the detection controller records initial information about the software, start time information about the software download, and stop time information about the software download.

5. The mobile device of claim 4, further comprising:
   a communication unit for allowing the control unit to access the at least one of the software provider and the other mobile device,
   wherein the control unit detects the initial information from the downloaded software and sends the initial information to the detection controller, and notifies the start time information and the stop time information to the detection controller.

6. The mobile device of claim 1, further comprising a sensor for detecting an external impact.

7. The mobile device of claim 6, wherein the sensor for detecting an external impact provides information to the detection history recording unit when an external impact greater than a threshold is detected.

8. The mobile device of claim 1, further comprising:
   a backup battery configured to supply electric power to the detection history recording unit in a sleep mode.

9. The mobile device of claim 1, wherein the external entity comprises at least one of a Subscriber Identity Module (SIM) card, a charger, a Universal Serial Bus (USB), a flash memory card, a battery, and an earphone.

10. A method for performing a black box function in a mobile device, the method comprising:
    performing a software download using an external entity when the external entity is connected;
    when a voltage exceeding a critical value is applied through at least one of a plurality of connection ports, determining terminal Identification (ID) information about the voltage-applied connection port and detection time information; and
    recording the terminal ID information and the detection time information,
    wherein the terminal ID information and the detection time information are determined in response to determining that the software download has not started after receiving a notification to download.

11. The method of claim 10, wherein the determining of the terminal ID information and the detection time information comprises:
    adjusting the applied voltage by an adjustable resistor; and
    determining the terminal ID information and the detection time information when the adjusted voltage is detected.

12. The method of claim 10, further comprising:
    when software is downloaded, recording initial information about the software, start time information about the software download, and stop time information about the software download.

13. The method of claim 12, wherein the recording of the initial information, the start time information and the stop time information comprises:
    determining the initial information and the start time information when the software download is started;
    determining the stop time information when the software download is stopped; and
    recording the initial information, the start time information and the stop time information.

14. The method of claim 10, wherein the external entity comprises at least one of a Subscriber Identity Module (SIM) card, a charger, a Universal Serial Bus (USB), a flash memory card, a battery, and an earphone.

15. The method of claim 10, further comprising:
    when an external impact exceeding a threshold is detected, determining a time of the impact; and
    recording the time of the impact.

16. The method of claim 10, wherein the determining of the terminal ID information comprises finding a path of an electric current in an external connection terminal.

17. The method of claim 10, wherein the terminal ID information and the detection time information are determined if it is determined that a software download has not started, and after the voltage exceeding the critical value is applied.

18. A method for performing a black box function in a mobile device, the method comprising:

determining if a software download has started;

when it is determined that the software download has not started, determining whether an external impact is applied to an external connection terminal, and if the external impact exceeds a threshold;

when it is determined that the external impact exceeds the threshold, determining one of terminal Identification (ID) information about the external connection terminal, and detection time information by identifying a current time in which the external impact is applied;

recording the one of the terminal ID information and the detection time information;

when it is determined that the software download has started, determining information related to the software download;

recording the information related to the software download; and based on one of the recorded terminal ID information, the detection time information, and the recorded information related to the software download, determining one of an external cause and an internal cause of a fault to the mobile device, wherein the external impact comprises one of an external voltage that is applied to the external connection terminal, wherein, when it is determined that the external voltage exceeds the threshold, adjusting the external voltage, wherein it is determined whether the external impact is applied to the external connection terminal in response to determining that the software download has not started after receiving a notification to download.

19. The method of claim 18, wherein the external impact comprises an external physical impact applied to the mobile device.

20. The method of claim 18, further comprising:

when it is determined that the software download has started, determining whether the software download has stopped before completion of the software download; and when it is determined that the software download has stopped, recording additional information related to the software download, wherein the information related to the software download comprises one of a download start time information and initial software information, and wherein the additional information comprises information on a time when the software download has stopped.

* * * * *